(12) United States Patent
Capobianco et al.

(10) Patent No.: US 9,738,564 B2
(45) Date of Patent: Aug. 22, 2017

(54) TAPE CASTING USING SLURRY FROM A CAVITATION APPARATUS AND METHODS OF MAKING SAME

(71) Applicant: Applied Cavitation, Inc., Goleta, CA (US)

(72) Inventors: Joseph Albert Capobianco, Marlton, NJ (US); Dana Lynn Hankey, Santa Barbara, CA (US); Marshall Campion Tibbetts, Goleta, CA (US)

(73) Assignee: Applied Cavitation, Inc., Goleta, CA (US)

( * ) Notice: Subject to any disclaimer, the term of this patent is extended or adjusted under 35 U.S.C. 154(b) by 0 days.

(21) Appl. No.: 14/786,668

(22) PCT Filed: May 2, 2014

(86) PCT No.: PCT/US2014/036565
§ 371 (c)(1),
(2) Date: Oct. 23, 2015

(87) PCT Pub. No.: WO2014/182564
PCT Pub. Date: Nov. 13, 2014

(65) Prior Publication Data
US 2016/0060177 A1    Mar. 3, 2016

Related U.S. Application Data

(60) Provisional application No. 61/819,549, filed on May 4, 2013.

(51) Int. Cl.
*H02K 3/00* (2006.01)
*C04B 35/626* (2006.01)
(Continued)

(52) U.S. Cl.
CPC .......... *C04B 35/62625* (2013.01); *B05D 1/26* (2013.01); *B05D 3/12* (2013.01);
(Continued)

(58) Field of Classification Search
CPC . C04B 35/62625; C04B 35/14; C04B 35/515; C04B 35/632; B05D 1/26; B05D 3/12
(Continued)

(56) References Cited

U.S. PATENT DOCUMENTS

2003/0209534 A1    11/2003   Ferguson
2004/0162014 A1     8/2004   John
(Continued)

OTHER PUBLICATIONS

International Search Report & Written Opinion on PCT/US2014/036565 dated Sep. 22, 2014.
(Continued)

*Primary Examiner* — William Phillip Fletcher, III
(74) *Attorney, Agent, or Firm* — Foley & Lardner LLP; John D. Lanza

(57) ABSTRACT

Provided in one embodiment is a method of making, comprising: applying a hydrodynamic cavitation process to a raw material comprising particles comprising a metal-containing material or a carbon containing material of a first size to produce a slurry having particles comprising the metal-containing material or the carbon-containing material of a second size, smaller than the first size; and tape casting the slurry to form a green tape. Apparatuses employed to apply the method and the exemplary compositions made in accordance with the method are also provided.

23 Claims, 8 Drawing Sheets

(51) Int. Cl.
  *B32B 18/00* (2006.01)
  *B22D 23/00* (2006.01)
  *C04B 35/14* (2006.01)
  *C04B 35/468* (2006.01)
  *C04B 35/632* (2006.01)
  *C04B 35/634* (2006.01)
  *B28B 1/30* (2006.01)
  *B05D 1/26* (2006.01)
  *B05D 3/12* (2006.01)
  *C04B 35/515* (2006.01)

(52) U.S. Cl.
  CPC ............... *B22D 23/00* (2013.01); *B28B 1/30* (2013.01); *B32B 18/00* (2013.01); *C04B 35/14* (2013.01); *C04B 35/468* (2013.01); *C04B 35/515* (2013.01); *C04B 35/632* (2013.01); *C04B 35/634* (2013.01); *C04B 2235/3234* (2013.01); *C04B 2235/3418* (2013.01); *C04B 2235/5418* (2013.01); *C04B 2235/5436* (2013.01); *C04B 2235/5463* (2013.01); *C04B 2235/60* (2013.01); *C04B 2235/608* (2013.01); *C04B 2235/6025* (2013.01); *C04B 2235/61* (2013.01); *C04B 2237/32* (2013.01)

(58) Field of Classification Search
  USPC .............................. 427/357, 358; 501/1, 154
  See application file for complete search history.

(56) References Cited

U.S. PATENT DOCUMENTS

| | | | |
|---|---|---|---|
| 2004/0247970 A1 | 12/2004 | Irvine et al. | |
| 2009/0176957 A1* | 7/2009 | Pandit | C08C 1/02 526/340 |
| 2010/0224711 A1 | 9/2010 | Kreisler et al. | |
| 2011/0250521 A1* | 10/2011 | Moon | H01M 4/8657 429/478 |

OTHER PUBLICATIONS

European Search Report DTD Dec. 7, 2016 on European Appln. No. 14794137.1.
Janis Justs et al., "Cavitation Treatment of Nano and Micro Filler and Its Effect on the Properties of UHPC", Proceedings of Hipermat 2012, Mar. 7, 2012, http://alephfiles.rtu.lv/TUA01/000037297_e.pdf [retrieved on Nov. 29, 2016], pp. 87-92.

* cited by examiner

| Raw Filler | | | |
|---|---|---|---|
| Sample | d10 | d50 | d90 |
| 1 | 2.328 | 4.508 | 30.13 |
| | 2.319 | 4.48 | 29.942 |
| 2 | 2.317 | 4.446 | 25.581 |
| | 2.313 | 4.454 | 28.62 |
| 3 | 2.322 | 4.494 | 29.731 |
| | 2.319 | 4.477 | 29.731 |

| Silica Slip | | | |
|---|---|---|---|
| Material | Density | Weight % | Volume % |
| Lord Filler | 2.25 | 66.31% | 46.66% |
| Resin Blend A | 1 | 33.69% | 53.34% |
| Total | | 100.00% | 100.00% |

| Pass | Operating Pressure (PSI) | Temperature (°C) | Time (minutes) | d10 | d50 | d90 |
|---|---|---|---|---|---|---|
| 1 | 8000 | 25 | 15 | 2.582 | 4.398 | 7.415 |
|   |      |    |    | 2.583 | 4.399 | 7.414 |
| 2 | 8000 | 25 | 15 | 2.582 | 4.396 | 7.409 |
|   |      |    |    | 2.583 | 3.394 | 7.407 |
| 3 | 10000 | 30 | 12 | 2.541 | 4.322 | 7.344 |
|   |       |    |    | 2.541 | 4.323 | 7.351 |
| 4 | 10000 | 30 | 10 | 2.54 | 4.321 | 7.344 |
|   |       |    |    | 2.542 | 4.321 | 7.347 |
| 5 | 10000 | 25 | 10 | 2.539 | 4.285 | 7.331 |
|   |       |    |    | 2.538 | 4.291 | 7.336 |
| 6 | 11500 | 35 | 10 | 2.424 | 4.065 | 6.832 |
|   |       |    |    | 2.424 | 4.064 | 6.83 |
| 7 | 11500 | 35 | 10 | 2.422 | 4.06 | 6.824 |
|   |       |    |    | 2.422 | 4.06 | 6.823 |

Figure 4D

| Brookfield RVT Viscometer with 03 @ 20.8°C | | | |
|---|---|---|---|
| RPM | Dial Reading | Factor | Viscosity (Pa*s) |
| 5 | 11.0 | 200 | 2200 |
| 10 | 22.5 | 100 | 2250 |
| 20 | 46.0 | 50 | 2300 |
| 50 | 100+ | 20 | over |

Figure 4E

| Brookfield RVT Viscometer with 03 @ 21.1°C | | | |
|---|---|---|---|
| RPM | Dial Reading | Factor | Viscosity (Pa*s) |
| 5 | 25.0 | 200 | 5000 |
| 10 | 45.0 | 100 | 4500 |
| 20 | 69.0 | 50 | 3450 |
| 50 | 100+ | 20 | over |

TAPE CASTING USING SLURRY FROM A CAVITATION APPARATUS AND METHODS OF MAKING SAME

RELATED APPLICATIONS

This application is a U.S. National Stage Application claiming the benefit of and priority to International Application No. PCT/US2014/036565, filed May 2, 2014, which claims priority from U.S. Provisional Application Ser. No. 61/819,549, filed May 4, 2013, both of which are hereby incorporated by reference in their entirety.

BACKGROUND

Industry standard processes such as three-roll milling, attritor milling and bead milling are commonly used to fabricate dispersed particles, but these techniques suffer several drawbacks, including poor dispersity of the particles and the agglomeration of the particles in the product. Emulsifying equipment that is capable of cavitating very low viscosity materials, such as liquids, has been employed to replace the milling techniques. However, these cavitation systems are only capable of processing very low viscosity liquids; the capability of the system constrained by whether these materials are able to flow into the machine. These pre-existing systems are not equipped to process any medium or high viscosity materials because these types of materials would not be able to flow into the pre-existing cavitation systems. For example, in the pre-existing cavitation systems, not even yogurt may flow into the cavitation machine.

SUMMARY

In view of the foregoing, the Inventors have recognized and appreciated the advantages of tape casting using slurry from a cavitation apparatus and method of making same.

Accordingly, provided in one aspect is a method of making, the method comprising: applying a hydrodynamic cavitation process to a raw material comprising particles comprising a metal-containing material or a carbon-containing material of a first average size to produce a slurry having particles comprising the metal-containing material or the carbon-containing material of a second average size, smaller than the first size; and tape casting the slurry to form a green tape.

In some embodiments, the method includes controlling a temperature of the raw material to be within a range of about 10 degrees Celsius to about 90 degrees Celsius before and after the hydrodynamic cavitation process. In some embodiments, the method includes repeating applying the hydrodynamic cavitation process to the slurry at least once to further reduce the size of the metal-containing particles to a third size, smaller than the second size, prior to tape casting the slurry to form the green tape. In some embodiments, the hydrodynamic cavitation process further includes subjecting the raw material to a hydraulic pressure of about 1,000 psi to about 65,000 psi.

In some embodiments, the slurry is produced at a rate of about 0.1 liters per minute to about 5 liters per minute. In some embodiments, the raw material further comprises at least one of a deflocculant, a binder, and a plasticizer. In some embodiments, the raw material has a first viscosity and the slurry has a second viscosity, lower than the first viscosity.

In some embodiments, the green tape has a thickness of about 100 microns and the thickness of the green tape varies by less than about 3% at multiple points across a surface of the green tape. In some embodiments, the green tape has a thickness of about 100 microns and a roughness parameter $R_a$ of less than or equal to about 0.4 microns. In some embodiments, the green tape has a density of about 60% to about 80%. In some embodiments, the method does not include ball milling the raw material. In some embodiments, the method does not include de-airing the product material.

In some embodiments, the method further includes forming the green tape into a device suitable for use as at least a component of at least one of: a transfer tape for artistic applications, a pottery coating, a photoactive glass film, a refractory ceramic, a catalyst support; a fuel k insert, a loudspeaker cover, a ceramic-impregnated fabric, an infrared sensor, an implantable electronic device, a power amplifier module, a radio frequency front end module, a transmission control unit, an energy harvester, or a biosensor.

Provided in another aspect is a composition comprising a slurry formed from: particles comprising at least a metal-containing material or a carbon-containing material, wherein the particles are formed from a hydrodynamic cavitation process using at least a plurality of primary particles having a first average size. The composition further comprises at least one deflocculant; at least one plasticizer, and at least one binder. The particles have a second average size and the second average size is less than or equal about two times the first average size.

In some embodiments, the second average size has a maximum diameter of about 10 microns. In some embodiments, the composition has a viscosity of about 1 Kcps to about 200 Kcps. In some embodiments, the metal-containing material comprises at least one of a metal, a metal alloy, a nitride, an oxide, a chalcogenide, a boride, and an oxynitride.

Provided in another aspect is a method of making, comprising: introducing a volume of a raw material comprising at least one deflocculant, at least one plasticizer, at least one binder, and particles comprising at least a metal-containing material or a carbon-containing material through a first orifice of a chamber; applying a hydrodynamic cavitation process to the raw material in the chamber to produce a slurry, wherein the particles comprising at least one metal-containing material have a first average particle size in the raw material and a second average particle size in the slurry, the second average particle size smaller than the first average particle size; causing the slurry to exit the cavitation chamber through a second orifice; and tape casting the slurry to form a green tape.

In some embodiments, the method includes controlling a temperature of the raw material to be within about 10 degrees Celsius to about 90 degrees Celsius before and after the hydrodynamic cavitation process. In some embodiments, applying the hydrodynamic cavitation process further comprises subjecting the raw material to a hydraulic pressure of about 1,000 psi to about 65,000 psi. In some embodiments, the method does not include ball milling the raw material. In some embodiments, the green tape has a thickness of about 100 microns, the thickness of the green tape varies by less than about 3% at multiple points across a surface of the green tape, and the green tape has a roughness parameter $R_a$ of less than about 0.4 microns.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 4A-4G illustrate data associated with particles of silica in one embodiment prior to a cavitation process and after a cavitation process as provided in one exemplary cavitation process.

DETAILED DESCRIPTION

Figure 1:
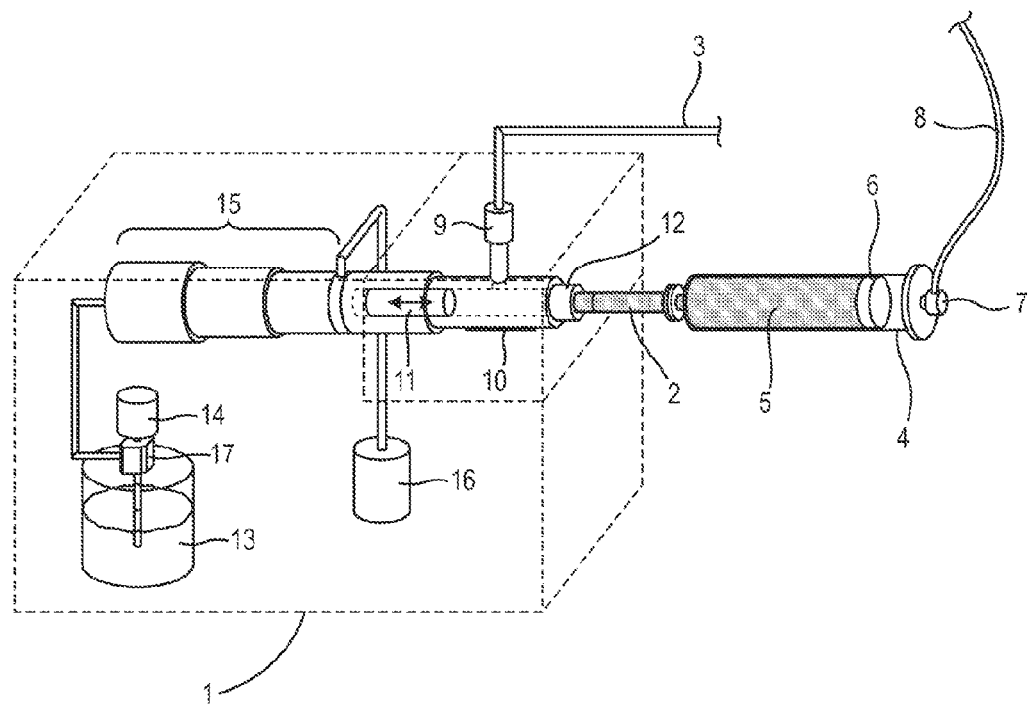
FIG. 1 provides a schematic of an example cavitation machine in one embodiment.

Following below are more detailed descriptions of various concepts related to, and embodiments of, tape casting using slurry from a cavitation apparatus and method of making same. It should be appreciated that various concepts introduced above and discussed in greater detail below may be implemented in any of numerous ways, as the disclosed concepts are not limited to any particular manner of implementation. Examples of specific embodiments and applications are provided primarily for illustrative purposes.

Cavitation

Cavitation may refer to the formation of vapor cavities in a liquid (e.g., small liquid-free zones such as "bubbles" or "voids") that are formed as a result of forces acting upon the liquid. The process generally may occur when a liquid is subjected to rapid changes of pressure that cause the formation of cavities where the pressure is relatively low. When subjected to higher pressure, the voids may implode and may generate an intense shockwave. Depending on the application, any suitable mode of cavitation may be employed in the methods and systems provided herein. For example, the cavitation process in one embodiment may involve, or be, hydrodynamic cavitation.

Hydrodynamic cavitation may refer to a process of vaporization, bubble generation, and bubble implosion, which occurs in a flowing liquid as a result of a decrease and subsequent increase in pressure. Hydrodynamic cavitation may be produced by passing a liquid through a constricted channel at a specific velocity or by mechanical rotation of an object through a liquid. In the case of the constricted channel and based on the specific (or unique) geometry of the system, the combination of pressure and kinetic energy may create the hydrodynamic cavitation cavern downstream of the local constriction generating high energy cavitation bubbles.

Orifices and venturi may be used for generating cavitation. A venturi may be employed because of its smooth converging and diverging sections, such that that it may generate a higher velocity at the throat for a given pressure drop across it. On the other hand, a set of orifices may accommodate more numbers of holes (larger perimeter of holes) in a given cross sectional area of the pipe. Both options are possible.

Some of the pre-existing cavitation systems utilize opposing water jets to create the pressure needed for cavitation to occur while others create the pressure and resulting vacuum by having hydraulic pumps driving and oscillating plungers which draw the low viscosity materials in and then pushes the low viscosity material through the specific point where cavitation occurs. However, none of these pre-existing systems is equipped to handle a raw material that has a viscosity larger than that of a fluid, to disperse the constituents, or to attain the desired particle size distribution through de-agglomeration.

Cavitation Equipment

Depending on the application, any suitable equipment capable of carrying out a cavitation or an emulsifying process may be employed. Provided in one embodiment is an apparatus system, comprising: a first feed tube adapted to contain a raw material, which has a first viscosity and is to be supplied into a hydrodynamic cavitation chamber that is downstream and separate from the apparatus. The system may also comprise an air-driven piston configured to create a condition having a first pressure and a first temperature sufficiently high to reduce the first viscosity to a second viscosity being sufficiently low for the raw material to be pushed into an orifice of the hydrodynamic cavitation chamber to undergo a hydrodynamic cavitation process to form a product material.

FIG. 1 provides a schematic illustration of one embodiment of a base cavitation or emulsifying machine 1 that may be employed in the methods described herein. The machine comprises an inlet 2 and an outlet 3. The machine may be a commercially available cavitation machine or may be a custom-designed cavitation machine. The base cavitation machine 1 is described further below in FIG. 2. The apparatus system provided herein configured to feed the raw material into the base cavitation machine 1 may refer to the system that is attached to the base cavitation machine 1, such as at the inlet 2 thereof. Alternatively, the apparatus system provided herein may refer to a fabrication system comprising a combination of both the base cavitation machine 1 and the attached system, as shown in FIG. 1.

Referring to FIG. 1, the apparatus system may comprise at least one feed tube 4, a raw material 5 inside the feed tube 4, and a piston 6 that pushes the material down the feed tube 4, forcing it into the inlet 2 of the machine 1. The apparatus system may also comprise an air valve 7 on the back end of the feed tube 4, which air valve 7 controls the flow of compressed air into the feed tube 4. The apparatus system may comprise an air line 8, which feeds compressed air into the air valve 7 and into the feed tube 4 from a source of compressed air.

The base cavitation machine 1 may comprise any suitable components, depending on the application. For example, the base cavitation machine may comprise two hydraulic pumps which are utilized to push the paste through a very small orifice, into a very small vacuum chamber, and out another very small orifice that creates a specific desired back pressure. In one embodiment, this combination of small orifices with a vacuum chamber in the middle is where the hydrodynamic cavitation occurs. In some embodiments, the cavitation machine may include other components configured to introduce raw material through the small orifice. For example, the cavitation machine may include components configured to inject, push, and/or or push the raw material through the very small orifice without the use of hydraulic pumps or pistons. Any suitable techniques of forcing, injecting, and pushing may be employed.

The base cavitation machine 1 also includes a hydraulic reservoir 13, a motor 14, which runs a pump 17, to pump the hydraulic oil up to an intensifier 15, which drives the oscillating plunger 11 that pushes the material up into the cavitation chamber 9, while the ball check system 12 closes to allow the material to be forced into the cavitation chamber, where the orifices are housed and the cavitation takes place. As the intensifier 15 pushes the plunger 11 forward, hydraulic oil in the front of the intensifier 15 is pushed against a nitrogen bag 16. After the plunger 11 is all the way forward, a positioning sensor stops the hydraulic pump 17 from driving the intensifier 15, and the pressure accumulates against the nitrogen bag 16, causing the plunger 11 to be pushed back to its starting position.

Depending on the application, the setups, including the number of feed tubes, may be varied. In one embodiment, a small single feed tube containing the medium to high viscosity raw material may be employed for small batches that may be tested after each pass through the cavitation machine. The cavitation process may generate a lot of heat in the material being processed. In one embodiment, a thermal control system may be employed to control the temperature of the product material as it enters or exits the cavitation machine 1 so that the material may exit the cavitation process at an appropriate and stable temperature. The temperature is preferably below a thermal degradation temperature of the product material. The thermal degradation temperature is a function of the material properties of the constituents of the material. For example, downstream from the cavitation chamber, one embodiment of the apparatus system may further comprise a thermal control system, which comprises at least one of a heat exchanger, a thermal couple, and a cooling fluid reservoir configured to supply the fluid to cool the product material discharged from the hydrodynamic cavitation chamber. The thermal control system may be configured to control the second temperature to be below a thermal degradation temperature of the raw material.

In some embodiments, the product material may be subjected to the cavitation process more than one time. For example, an operator may choose the number of times the material will pass through the cavitation machine, thereby repeating the cavitation processes. In one embodiment, after the pre-determined number of passes is achieved, the system, as well as the air driving the valves and pistons, may automatically shut off. This safety feature may release the air pressure once the current cycle is completed. In one embodiment, the system setups described herein allow samples of the material to be taken at any time to determine if the desired results have been achieved after a certain number of passes at the desired operating pressure(s) and temperature(s).

In one embodiment, the apparatus systems provided herein may control the temperature of the material by at least one of software and several thermal couples used to determine the temperature of the material at several points in the process and actuate a water valve, which controls the flow of chilled water to a heat exchanger put inline directly after the cavitation takes place. In one embodiment, the material is cooled after cavitation to reduce the temperature to a range that is suitable for the material being processed so that it remains stable and ready for the next cycle or pass. Without this temperature control system, the material in at least one embodiment may retain too much heat and may gain even more heat energy though each pass, resulting in damaging some of its constituents. When the material is processed with set parameters for pressure and temperature, which may be determined for each material through trial and errors and/or parametric studies, the consistency of the product from lot to lot is surprisingly far superior to any other pre-existing process for preparing medium to high viscosity inks, pastes, slurries or dispersions of nano-particles. The ability to move medium to high viscosity materials in a continuous and controlled manner through the cavitation process by the apparatus systems and methods described herein is unexpected over the pre-existing methods.

In some embodiments, the product material has a viscosity of about 1 Kcps to about 200 Kcps. In some embodiments, the product material has a viscosity of about 1.5 Kcps to about 100 Kcps. In some embodiments, the product material has a viscosity of about 4 Kcps to about 50 Kcps. In some embodiments, the product material has a viscosity of about 9 Kcps to about 16 Kcps. Other (ranges of) viscosity values are also possible, depending on the desired application. The slurry may be employed in tape casing.

Composition

The methods and systems described herein are versatile with respect to the types of raw material they may be applicable to. Several material properties, including viscosity, geometry, size, etc., of the product material have already been described above. The product material may also comprise a plurality of different materials. In one embodiment, the product material may comprise a composition comprising particles comprising at least one metal-containing material. The term "metal-containing material" refers to a material that contains any form of a metal element. The term "element" refers to the chemical symbol that may be found on a Periodic Table. Thus, a metal-containing element may refer to a material containing pure metal, metal alloys, metal compounds, mixtures of the foregoing, and the like. More specifically, a metal-containing material may exhibit metal like behavior (e.g., pure metal, alloys, etc.) or non-metal like behavior (e.g., semiconductor, metal-containing composites, metal-containing compounds, such as ceramics—e.g., oxide, nitride, chalcogenide, boride, carbide, oxynitride, etc.). The non-metal material may comprising carbon. The carbon-containing material may comprise at least one of carbon nanotubes, graphite, and graphene. The nanotubes may be single-walled nanotube or multi-walled nanotubes. The metal-containing material may thus include a metal, a metal alloy, a nitride, an oxide, a chalcogenide, a boride, an oxynitride, or any other type of material that includes a metal element found in the Periodic Table. In some embodiments, the metal-containing material may include pure, mixtures, alloys and compounds (e.g., nitrides, oxides, carbides, chalcogenide, etc.) of base, precious, noble, rare earth, alkali, and transition metals containing: lithium, sodium, potassium, rubidium, cesium, francium, beryllium, magnesium, calcium, strontium, barium, scandium, titanium, vanadium chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, copernicium, aluminum, gallium, indium, tin, thallium, lead, bismuth, polonium, lanthanum, cerium, praseodymium, neodymium, promethium, samarium, europium, gadolinium, terbium, dysprosium, holmium, erbium, thulium, ytterbium, lutetium, actinium, thorium, protactinium, uranium, neptunium, plutonium, americium, curium, berkelium, californium, einsteinium, fermium, mendelevium, nobelium, lawrencium, germanium, arsenic, antimony, or astatine. In yet other embodiments, the metal-containing material may include any of the following materials: aluminum magnesium boride, aluminum oxynitride, barium strontium cobalt ferrite, barium titanate, beryllium oxide, bismuth strontium calcium copper oxide, bone china, boron nitride, briquetage, calcium aluminates, cenosphere, ceramic colorants, ceramic flux, ceramic foam, ceramic matrix composite, cerium hexaboride, coade stone, crittersol, dysprosium titanate, earthenware, electroceramics, expanded clay aggregate, ferroelectric ceramics, fire clay, frit, fumed silica, geopolymer, geopolymer concrete, germanium dioxide, glass-ceramic, grog (clay), hafnium diboride, hydroxyapatite, jesmonite, kaolin/kaolinite, lanthanum gallium silicate, lanthanum hexaboride, lanthanum strontium cobalt ferrite, lanthanum strontium manganite, lead scandium tantalate, lead zirconate titanate, lumicera, magnesium diboride, magnesium oxide, martensite, nile silt, MAX phases, metal clay, molybdenum disilicide, mud, porcelain, paper clay, quartz, sea pottery, sialon, silica fume, silicon boride, silicon carbide, silicon dioxide, silicon nitride, silicon oxynitride, soapstone, strontium titanate, tetragonal polycrystalline zirconia, titanium carbide, tube-based nanostructures, tungsten disilicide, tungsten nitride, ultra-high-temperature ceramics, vitreous china, yttrium barium copper oxide, zinc oxide, zirconia toughened alumina, zirconium dioxide, AlN, Si3N4, SiC, WC, Al2O3, ZrO2 (Y, Mg, etc stabilized), MgO, SiO2, glasses, ZnO, TiO2, PbO, PbTiO3, PbZrO3, BaTiO3, BiTiO3, SrTiO3, MgTiO3, CaTiO3, solid solutions of ceramics, CeO (Gd, Sm, etc. stabilized), Y2O3, BeO, ceramic colorants, bismuth strontium calcium copper oxide, titanium chromium, manganese, iron, cobalt, nickel, copper, zinc, molybdenum, ruthenium, rhodium, palladium, silver, tantalum, tungsten, rhenium, osmium, iridium, platinum, gold, aluminum, gallium, indium, tin, lead, or bismuth.

In some embodiments, the product material also comprises at least one defloculent, at least one plasticizer, and/or at least one binder. Any of the constituent particles can have any of the particle sizes as described above. The product material can be formed through a hydrodynamic cavitation process as described above.

Tape Casting Fabrication Process

Figure 2:
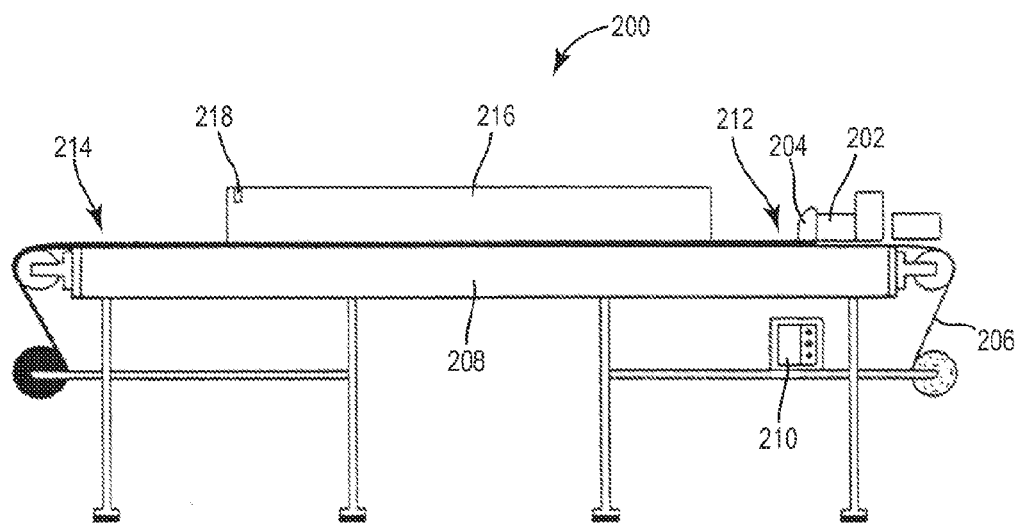
FIG. 2 provides a schematic of doctor blading assembly that can be used to tape cast a slurry produced by the cavitation machine shown in FIG. 1 in one embodiment.

FIG. 2 shows a system 200 for tape casting the product material formed using the cavitation machine 1 of FIG. 1. A product material (e.g., ceramic slurry) is introduced into the cavity 202 of the assembly and flows out under the doctor blade 204 as the carrier film 206 moves below. The carrier film 206 is a clean smooth film such as cellulose acetate, Teflon, or Mylar. In some other embodiments, the assembly including the doctor blade 202 moves over the film 206, while the film 206 remains in place. In the example shown in FIG. 2, the film 206 moves under a doctor blade 204 in a continuous process. In some embodiments, the film is supported by a table 208 and driven by a drive motor 210

The thickness of the tape is determined by the height of the doctor blade 204 above the carrier film 206, the relative velocity of the assembly/carrier film system, and the drying shrinkage of the tape. Higher viscosity slurries may provide a more uniform thickness of a tape, but may be more prone to trapping bubbles. As the cavitation process does not trap bubbles within the slip, more uniform tapes can be prepared.

The drying of the tape may normally be controlled by passing the tape from the point labeled 212 to the point labeled 214 through a dryer 216. The dryer 216 can include an air inlet 218. To prevent destruction of the tape, the boiling point of the solvent should not be exceeded at least in one embodiment. After drying, the tape can be cut. For circuits to be formed from the tape, holes can be punched in the tape and the circuits are printed on the surface. As the tapes produced using cavitation have a more uniform density than tapes formed using other processes, defects associated with punching, (e.g., tears) and printing (e.g., dimensional changes as a result of the print dry processes) may be minimized, including substantially eliminated or even entirely eliminated, by using cavitation. This facilitates the development of multilayer parts formed from several layers of tape. Multilayer parts may then be laminated at pressures ranging from about 1 MPa to about 50 MPa—e.g., about 2 MPa to about 40 MPa, about 3 MPa to about 30 MPa, or any other suitable pressure range.

The cavitation processes described herein in at least some embodiments have the ability to minimize, or even substantially eliminate or even entirely eliminate, all agglomerates within a powder to achieve the nominal particle size. In some embodiments, the agglomerates are not minimized or eliminated, but rather the size thereof is reduced. For example, the average size of the particles in the slurry may be less than or equal to about three times that of the primary particle average sizes used to form the slurry (e.g., using the hydrodynamic cavitation process); the average size of the particles may be less than or equal to about two times, 1.5 times, or smaller than that of the primary particle average sizes. This facilitates the production of multilayer devices with tapes dispersed using cavitation because defects associated with agglomerates adversely affect performance. As defects are magnified with each additional layer, this can be useful for building co-fired packages with multiple layers of thin tape. When this shaping and laminating process is completed, organics can be additionally and optionally burned out of the tape, for example, by subjecting the tape to heat, and sintering can densify the part.

Figure 3:
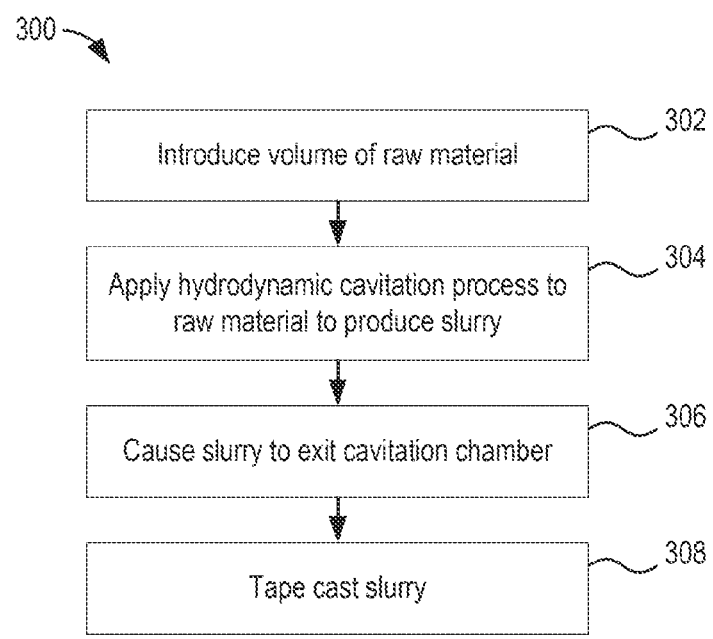
FIG. 3 provides a schematic flowchart illustrating in one embodiment a fabrication process using the cavitation machine shown in FIG. 1 and the doctor blading assembly shown in FIG. 2.

FIG. 3 shows a flow chart of a method 300, which includes introducing a volume of a raw material comprising at least one deflocculant, at least one plasticizer, and at least one binder, and particles comprising at least one metal-containing material through a first orifice of a chamber (stage 302); applying a hydrodynamic cavitation process to the raw material in the chamber to produce a slurry, wherein the particles comprising at least one metal-containing material have a first average particle size in the raw material and a second average particle size in the slurry, the second average particle size smaller than the first average particle size (stage 304); causing the slurry to exit the cavitation chamber through a second orifice (stage 306); and tape casting the slurry to form a green tape (stage 308).

The raw material may take the form of a multicomponent mixture including metal-containing particles. The raw material is loaded into an engineered cavitation feed tube, which is attached to a cavitation system. A piston in the feed tube can then be driven down the feed tube, pushing/forcing the raw material into the cavitation machine for processing. After the raw material is forced into the cavitation machine, the material goes through the cavitation process to produce a slurry, and the temperature increases due at least in part to thermal energy generated by high pressures. The raw material can then go into a heat exchanger after it exits the cavitation process to cool to a predetermined temperature. In some embodiments, the temperature of the material before and/or after the cavitation process can be controlled to be with a specific range of values, as described further below. Temperature control can be achieved, for example, by use of a software program configured to receive feedback from a thermocouple located downstream from the heat exchanger. The system can actuate a water valve that controls the flow of chilled water to the heat exchanger in response to instructions from the software. When the product exits the heat exchanger, it is within the desired predetermined temperature range. As a result, the product material (i.e., slurry) is at a stable temperature and it has been effectively de-agglomerated and all the constituents have been dispersed from the multicomponent mixture raw material.

In some embodiments, the apparatus systems described herein allow the raw material to undergo the cavitation process multiple times. For example, multiple passes through the cavitation machine may be useful in order to achieve a desired level of de-agglomeration or viscosity of the slurry. In some embodiments, the number of passes may be predetermined. The number of passes required may also determine an amount of time to produce a given volume of slurry. For example, in some embodiments, the raw material is cavitated to produce slurry at a rate of about 0.1 liters per minute to about 5 liters per minute. In one embodiment, this value may refer to per unit liter of slurry. In other embodiments, the slurry may be produced at a rate of about 0.05 liters per minute to about 10 liters per minute, about 0.5 liters per minutes to about 8 liters per minute, or about 1 liter per minute to about 3 liters per minute. Other rates may also be possible.

In some embodiments, the temperature of the raw material can be controlled before and/or after the hydrodynamic cavitation process. For example, the temperature of the raw material can be controlled to be within a range of about 1° C. to about 150° C.—e.g., about 5° C. to about 100° C., about 10° C. to about 90° C., about 20° C. to about 80° C., about 30° C. to about 70° C., etc. before and/or after the hydrodynamic cavitation process. Other values are also possible, depending on the application.

In one embodiment, the method 300 can also include subjecting the raw material to a hydraulic pressure during the cavitation process. The hydraulic pressure may be between about 100 psi and about 100,000 psi. For example, the hydraulic pressure may be between about 500 psi and about 80,000 psi, between about 1,000 psi and about 65,000 psi, between about 2,000 psi and about 50,000 psi, between about 3,000 psi and about 30,000 psi, etc. Other (ranges of) values are also possible, depending on the application.

In one embodiment of the method described herein, the raw material may have a first viscosity at room temperature and the product material (i.e., slurry) may have a second viscosity at room temperature. The second viscosity can be lower than the first viscosity. For example, the second viscosity of the slurry can be in the range of about 0.1 Kcps to about 500 Kcps—e.g., about 0.5 Kcps to about 250 Kcps, about 1 Kcps to about 200 Kcps, about 5 Kcps to about 100 Kcps, about 10 Kcps to about 50 Kcps, etc. There is no upper limit for the first viscosity. There is also no lower limit for the first viscosity, as the methods and system described herein can be equipped to handle the low viscosity materials that are processed by pre-existing cavitation techniques.

The product material as a result of the fabrication methods described herein may be further employed to make a variety of devices. For example, the method 300 also includes tape casting the slurry to form a green tape (stage 308). In some embodiments, the method does not need to include de-airing the product material (i.e., slurry) prior to tape casting. In some embodiments, the tape casting step can be carried out by the doctor blading assembly shown in FIG. 2. As discussed above, the doctor blading assembly can be configurable to select a desired thickness for the green tape. For example, in some embodiments the green tape may have a thickness of less than or equal to about 200 microns—e.g., less than or equal to about 150 microns, about 100 microns, about 80 microns, about 50 microns, about 20 microns, about 10 microns, about 5 microns, about 2 microns, or smaller. Other thicknesses are also possible, depending on the application. For example, in some embodiments, the green tape may comprise particles having an average size of about less than about 1 micron and comprising barium titanate and may have a thickness in the range of about 4 microns to about 5 microns. Such a green tape can be used for manufacturing multilayer capacitors or other electronic devices. In some implementations, the thickness of the green tape may be less than or equal to about 4 microns. The density of the green tape may be substantially higher than the density of green tape formed from a slurry that has not been subjected to a cavitation process. For example, the density of the green tape may be between about 40% to about 90%, between about 50% to about 85%, or between about 60% to about 80%. Other densities or ranges of density are also possible. The green tape can be formed into an electronic device, as described further below.

As described above, any part of the method, when used in conjunction with the apparatus systems described herein, may be automated. The automation may be accomplished at least in part by using a software program. In one embodiment, the software program is stored on a non-transitory computer-readable medium. The program, when executed, can cause at least one processor (such as a computer) to execute any of the methods (or portions thereof) described herein.

The methods and apparatus systems provided herein allow the size of particles making up a raw material to be reduced, dispersed, and/or de-agglomerated. In some embodiments, the method does not include ball milling the raw material. Instead, the raw material is de-agglomerated through the hydrodynamic cavitation process. The raw material may comprise a plurality of particles. The particles may have any geometry, including any shapes and sizes. For example, the particles may have a shape that comprises a sphere, a sheet, a flake, a frit, an ellipsoid, or an irregular shape. The particle may be of any size. The term "size" referred to herein may refer to the diameter, radium, length, width, height, etc., depending on the context and geometry of the particle. In one embodiment, when the term "size" is used to describe a plurality of particles, the size may refer to an average size of the plurality.

In one embodiment, the method may comprise reducing a first average size of the particles contained in the raw material to form particles having a second average size in the product material (i.e., slurry), the second average size being smaller than the first average size. The first size may be in the nanometer range or micrometer range. For example, the first (average) size of the particles may be between about 0.05 microns and about 100 microns—e.g., about 0.1 microns and about 50 microns, about 0.5 microns and about 10 microns, between about 0.25 microns and about 1 micron, etc. On the other hand, the second (average) size of the particles may less than about 20 microns—e.g., less than about 15 microns, less than about 10 microns, less than about 5 microns, less than about 2 microns, or less than about 1 micron. Other sizes may also be possible. In some embodiments, the particles in the raw material are referred to as primary particles and have a nominal size, and agglomerates of the primary particles may have sizes in the range of about 10 to about 100 time the size of the primary particles. The product material (i.e., slurry) may have substantially fewer agglomerates than the raw material. In some embodiments, the product material may be substantially free of agglomerates. In some embodiments, the particles in the slurry may have a maximum size of less than or equal to about two times the size of the primary particles. In some embodiments, the particles in the slurry may have a maximum size of less than about 1.5 times the size of the primary particles, less than about 3 times the size of the primary particles, less than about 4 times the size of the primary particles, or less than about 5 times the size of the primary particles. The particle size reduction effect of the methods and systems described herein in some embodiments is shown in FIGS. 4A-4B and 5.

Figures 4A, 4B, 4C:
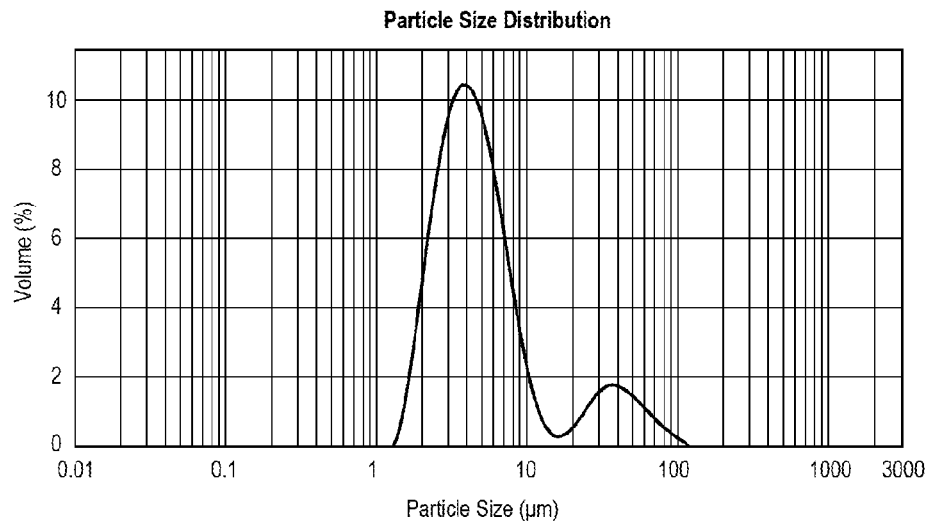

FIGS. 4A-4G show data relating to a first example of the particle size reduction and other material property changes that can be achieved using a hydrodynamic cavitation process. The particle size distribution of an initial raw material is shown in FIG. 4A. Three samples of material were formed from a 67 weight percent silica powder added to acetone. The samples were overhead mixed while submerged in a sonication bath for 20 minutes. As shown, the nominal size of particles in the samples is about 4 microns, but agglomeration also results in the presence of significantly larger particles (e.g., over 100 microns in size). Particle size in the initial samples was measured using a Malvern Mastersizer 2000, and the results are plotted in the graph of FIG. 4A. A summary of the particle size data for each of the three samples is shown in FIG. 4B. The silica (i.e., filler) and an organic carrier (i.e., resin blend A) were weighed on a two digit balance. The ratio of the two materials was defined by the relationship Filler=1.968×(blend A). The density, weight percent, and volume percent of the silica filler and organic carrier are shown in FIG. 4C.

Following these instructions, 100 grams of the carrier was added to a jar, and to this jar 196.8 grams of silica filler was progressively added. The powder and resin mixture were hand mixed with a spatula and charged into a cavitation machine. The material was passed once through the machine to wet-out the paste. Following the initial pass, and each subsequent pass, a particle size measurement was collected using the Malvern Mastersizer 2000. This data is shown in FIG. 4D.

FIG. 4E shows the viscosity data for the initial mix, and FIG. 4F shows the viscosity of the product material after seven passes through the cavitation machine. As shown, the product material viscosity appears to have changed from a Newtonian fluid (i.e., having a viscosity independent of shear rate) to thixotropic/pseudoplastic exhibiting shear thinning. It is possible that during the cavitation process, some agglomerates were further broken up, and the additional fine particles contribute to the thixotropic behavior of the product material.

Figure 4G:
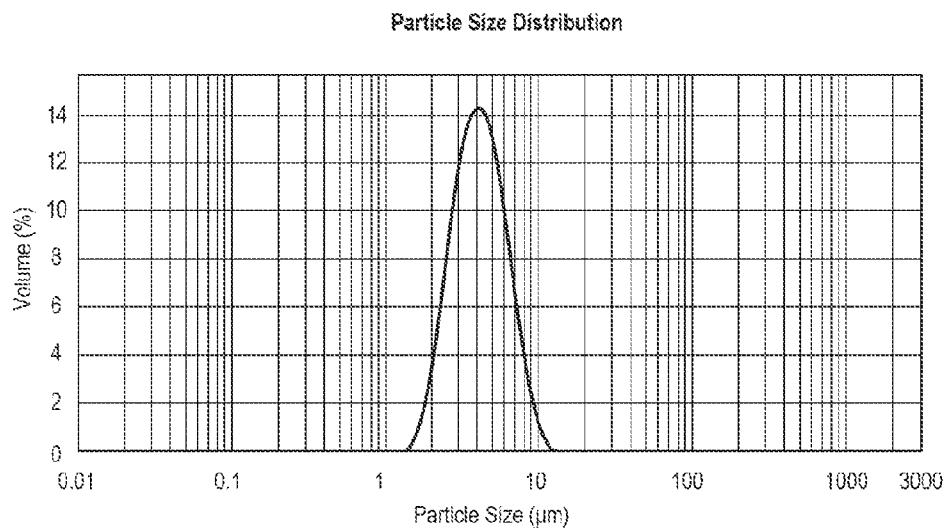
Figure 5:
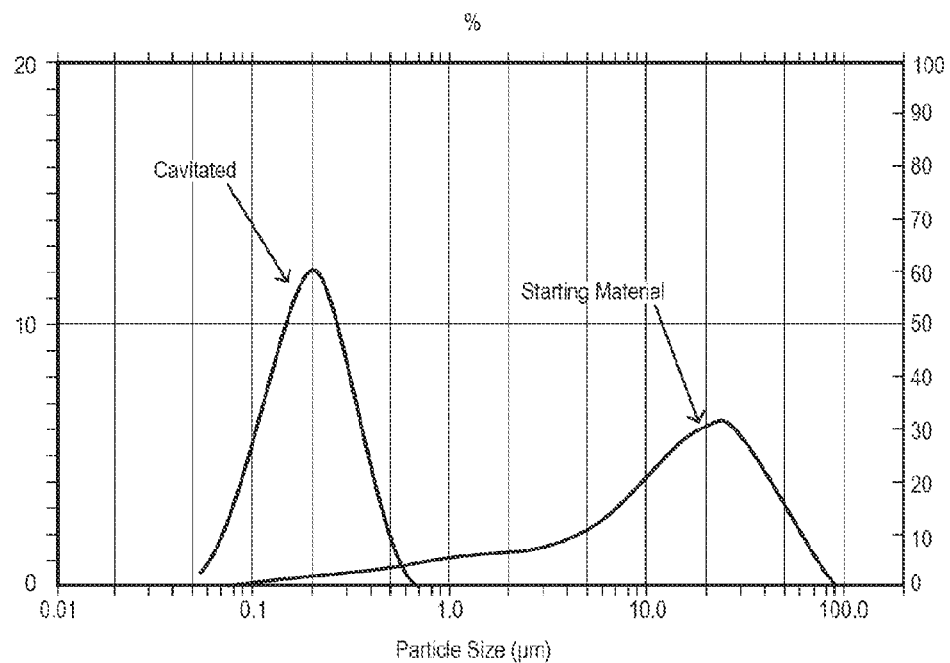
FIG. 5 illustrates particle size distribution for Ag particles in one embodiment prior to a cavitation process and after a cavitation process as provided in one exemplary cavitation process.

FIG. 4G shows the distribution of particle size after the seventh pass of the cavitation process was applied to the silica sample. As shown, after the cavitation process, the particles had an average size of about 400 microns and the sample was substantially free of agglomerates or particles greater in size than about 11 microns.

FIG. 5 shows a second example of the particle size reduction that can be achieved using a hydrodynamic cavitation process. The data used to generate the graph shown in FIG. 7 are based on a sample of silver powder having a nominal primary particle size of about 100 nm to about 200 nm. As shown, the starting material was highly agglomerated, despite its relatively small nominal particle size. The silver powder was mixed with ethanol as a solvent and subjected to a hydrodynamic cavitation process as discussed above. The particle size distribution of the cavitated product material is also shown in FIG. 7. The cavitated material was essentially free from agglomerates and had an average particle size of about 200 nm.

Figure 6A:
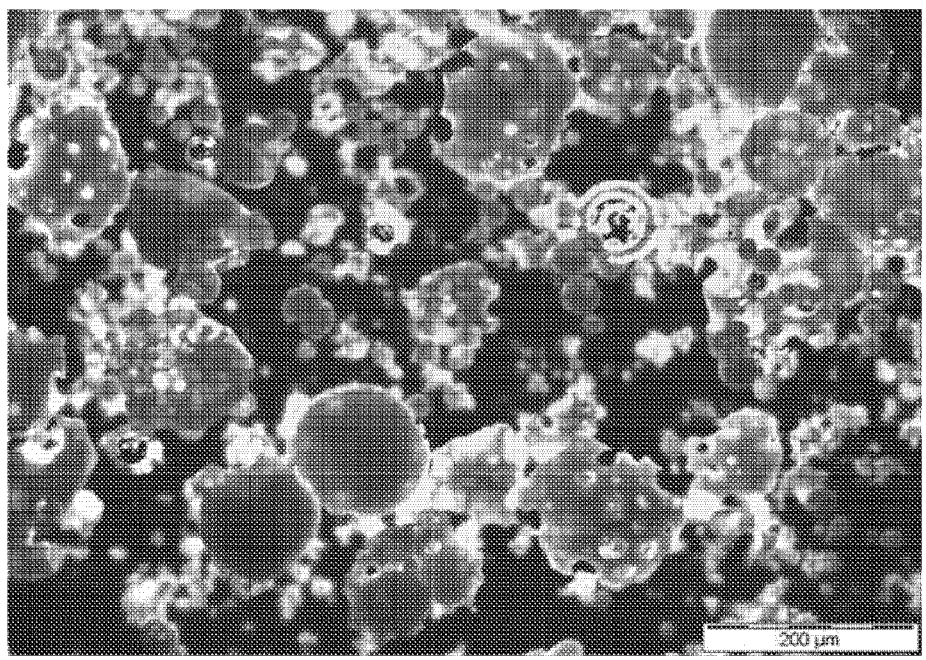
FIGS. 6A-6B provide scanning electron microscopy ("SEM") images of particles in one embodiment prior to a cavitation process and after a cavitation process as provided in one exemplary cavitation process.
Figure 6B:
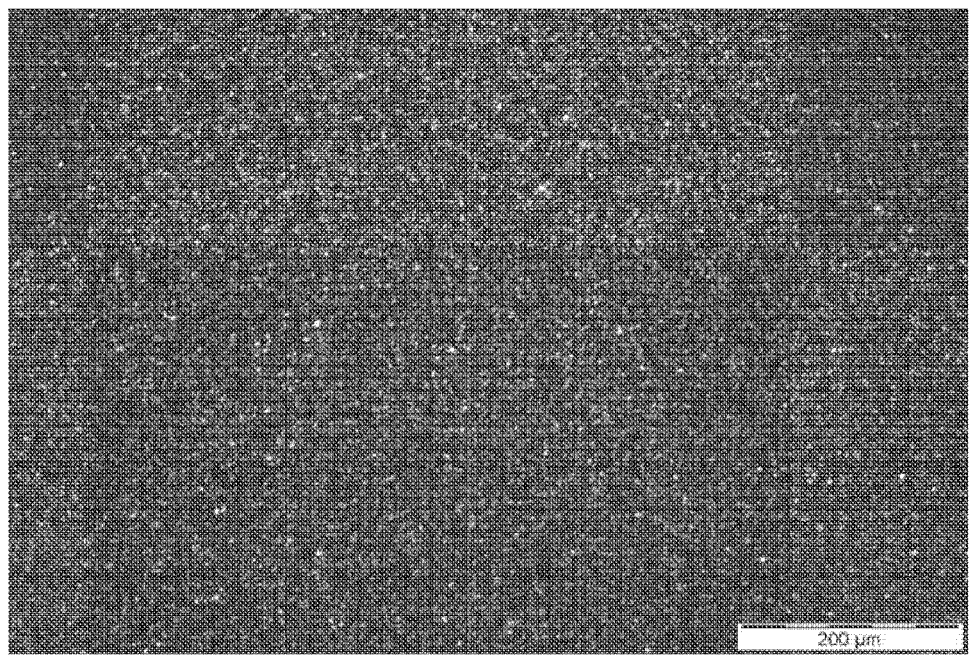

The reduction in size may be due in part to de-agglomeration of the particles. In other words, the method may comprise de-agglomerating the particles having a first size contained in the raw material to form particles having a second size in the product material, the second size being smaller than the first size. FIG. 6A and FIG. 6B illustrate the contrast in one embodiment between particles before and after de-agglomeration as a result of the cavitation process described herein. During de-agglomeration, the particles may be dispersed such that no visually observable agglomeration of the particles is observed in the product material. The elimination of agglomerates as shown in FIGS. 6A and 6B can be beneficial for the tape casting process described above. For example, tape that is cast from a slurry containing agglomerates can be of lower quality than tape cast from a slurry containing substantially no agglomerates. As a result, tape cast from a slurry that does not contain agglomerates can be more readily manufactured into useful devices.

Figure 7A:
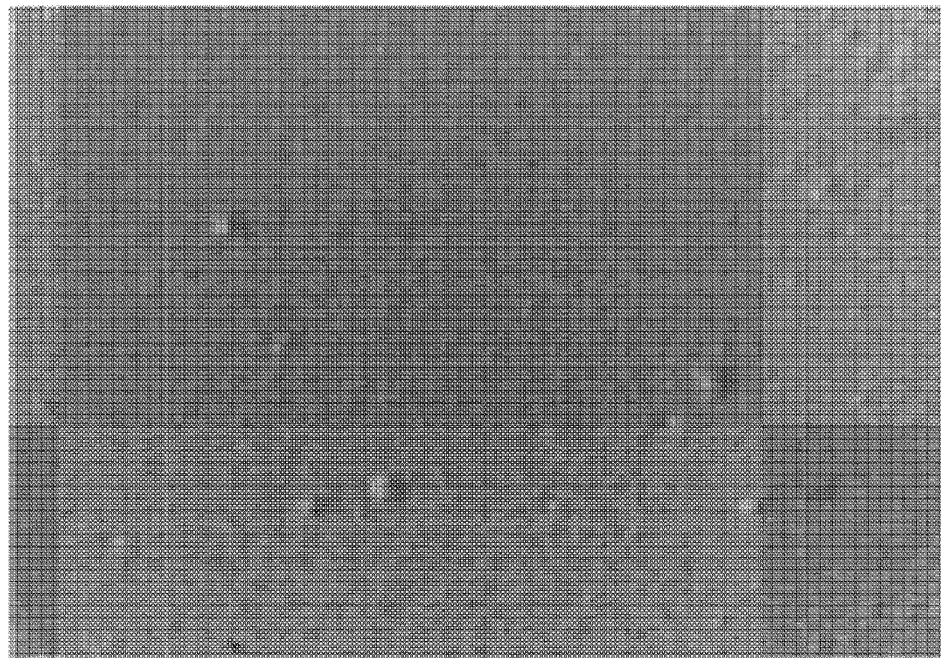
FIGS. 7A-7B provide photographs showing the differences in surface quality of green tape formed from a slurry made through a ball milling process and green tape formed from a slurry made through a cavitation process.
Figure 7B:
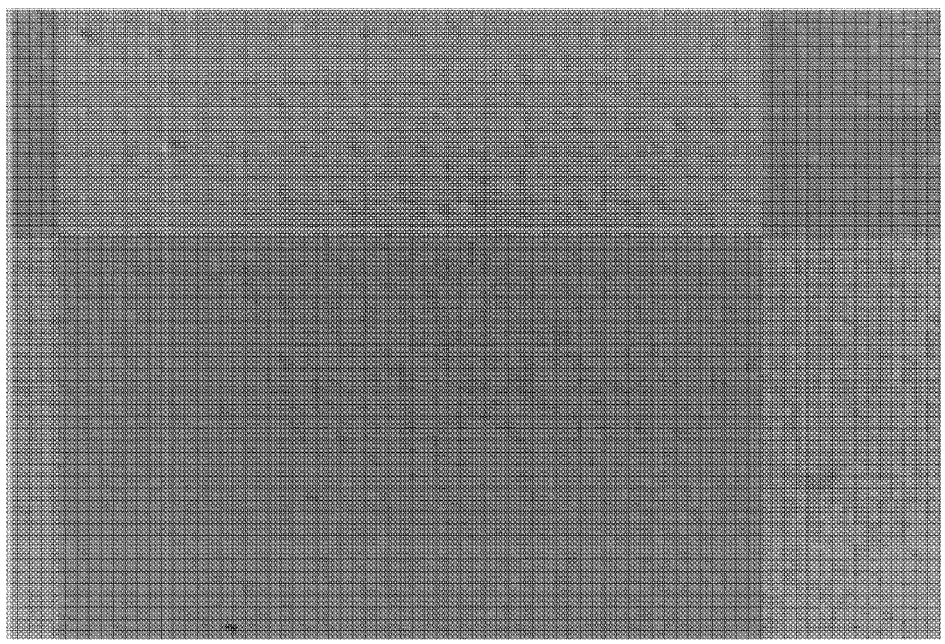

FIGS. 7A-7B show the differences in tape cast from a slurry formed by a ball milling process and tape cast from a slurry formed by a hydrodynamic cavitation process. The surface of the tape cast from slurry made by the ball milling process is shown in FIG. 7A. While the material shown in FIG. 7A was ball milled for about 20 hours, defects in the surface quality are still visible. FIG. 7B shows the surface of the tape cast from slurry made by a hydrodynamic cavitation process. The slurry used to form the tape shown in FIG. 7B was cavitated for only 10 minutes, yet the tape still has a higher quality (i.e., more uniform) surface than the tape shown in FIG. 7A. In some embodiments, tape cast from slurry formed by the cavitation process described above has a thickness that varies by less than about 5% at multiple points across the surface of the tape. In some other embodiments, the tape may have thickness variations of less than about 4%, less than about 3%, less than about 2%, or less than about 1% across multiple points on its surface. In some embodiments, the tape can have a roughness parameter $R_a$ of less than about 0.500 microns—for example, the tape may have a roughness parameter $R_a$ of less than or equal to about 0.450 microns, less than or equal to about 0.402 microns, less than or equal to about 0.4 microns, less than or equal to about 0.3 microns, less than or equal to about 0.2 microns, or less than or equal to about 0.1 microns, or smaller. Depending on the desired applications, other $R_a$ values are possible.

Figure 8:
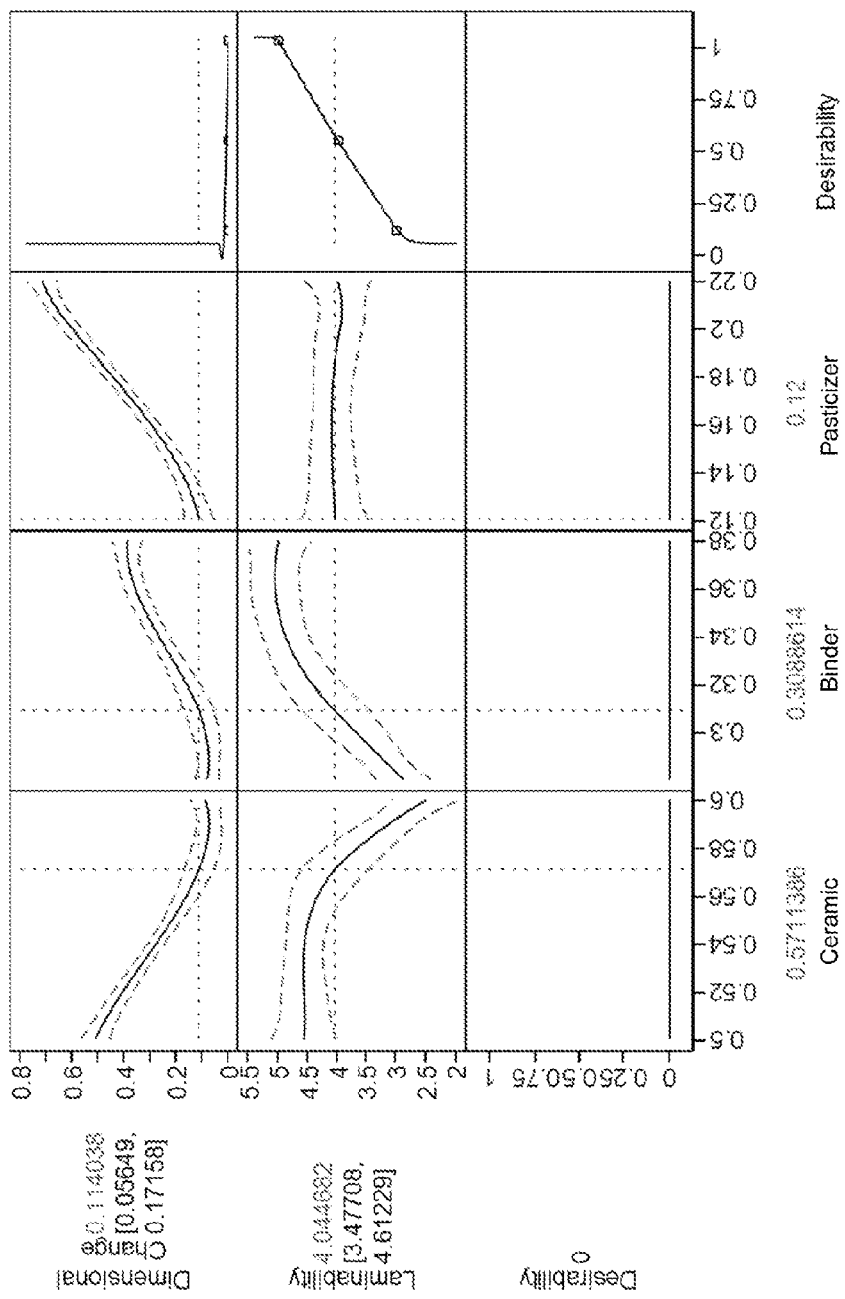
FIG. 8 shows the high dimensional stability of green tape cast from a slurry formed through a hydrodynamic cavitation process in one embodiment.

FIG. 8 shows the high dimensional stability of green tape cast from a slurry formed through a hydrodynamic cavitation process. As shown, in one embodiment, the tape can exhibit a dimensional change of only about 0.114038%. In other embodiments, different dimensional changes may be realized. In some embodiments, the relatively low dimensional change can be attributed at least in part to the reduction in polymer content of the green tape, relative to green tape made from a slurry that was formed using a ball milling process. The laminability measurement shown in FIG. 8 is a qualitative measurement on a scale of 1 to 5, with 1 representing the lowest laminability and 5 representing the highest laminability. As shown, in one embodiment, green tape cast using slurry formed through the hydrodynamic cavitation process described above can have a laminability value of about 4.044682. In other embodiments, the green tape may have a different laminability value.

Applications

The product material produced by the methods and systems described herein may be employed in a variety of applications. For example, the method may further comprise casting the product material into a thin tape to form at least part of an electronic device. The tape may be used to form a transfer tape for artistic or graphic applications, a pottery coating, a photoactive glass film, a refractory ceramic, a catalyst support; a fuel tank insert, a loudspeaker cover, a ceramic-impregnated fabric, an infrared sensor, an implantable electronic device, a power amplifier module, a radio frequency front end module, a transmission control unit, an energy harvester, or a biosensor. The method may be employed to fabricate multiplayer components, including chip capacitors, chip resistors, chip inductors, etc. The tape may also be used to form portions of any of the following devices: lithophane, Terracotta, electro and/or photo active glass films, refractory coatings, filters, defense electronics, aerospace electronics, optotelectronic housings for telecommunications, medical multichip devices such as implantable electronics (e.g., pacemakers, etc.), RF modules including RF front end modules WiMAX2 modules LTE-advanced modules, electronic power steering (EPS), electronic stability control, engine management systems, various sensor modules, radar modules, pressure sensors, stack actuators, multilayer capacitors, transformers, hermetic electronic devices, exhaust sensors, fuel cells, batteries, camera modules, small outline tuner modules, other thin profile modules for devices and components, integrated circuit (IC) tester boards, or other devices.

Additional Notes

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention may be implemented in any of numerous ways. For example, some embodiments may be implemented using hardware, software or a combination thereof. When any aspect of an embodiment is implemented at least in part in software, the software code may be executed on any suitable processor or collection of processors, whether provided in a single computer or distributed among multiple computers.

In this respect, various aspects of the invention may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media may be transportable, such that the program or programs stored thereon may be loaded onto one or more different computers or other processors to implement various aspects of the present technology as discussed above.

The terms "program" or "software" are used herein in a generic sense to refer to any type of computer code or set of computer-executable instructions that may be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." Any ranges cited herein are inclusive.

The terms "substantially" and "about" used throughout this Specification are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed:

1. A composition comprising a slurry formed from:
    particles comprising at least one metal-containing or carbon containing material, wherein the particles are formed from a hydrodynamic cavitation process using at least a plurality of primary particles having a first average size;
    at least one deflocculant;
    at least one plasticizer; and
    at least one binder,
    wherein the particles have a second maximum size and the second maximum size is less than or equal about two times the first average size.

2. The composition of claim 1, wherein the second maximum size has a diameter of about 10 microns.

3. The composition of claim 1, wherein the composition has a viscosity of about 1 Kcps to about 200 Kcps.

4. The composition of claim 1, wherein the metal-containing material comprises at least one of a metal, a metal alloy, a nitride, an oxide, a chalcogenide, a boride, and an oxynitride.

5. A method comprising:
    applying a hydrodynamic cavitation process to a raw material comprising particles comprising a metal-containing material or a carbon-containing material of a first average size to produce a slurry having particles comprising the metal-containing material or the carbon-containing of a second average size, smaller than the first size; and
    tape casting the slurry to form a green tape.

6. The method of claim 5, further comprising:
controlling a temperature of the raw material to be within about 10 degrees Celsius to about 90 degrees Celsius before and after the hydrodynamic cavitation process.

7. The method of claim 5, further comprising repeating applying the hydrodynamic cavitation process at least once to the slurry to further reduce the size of the metal-containing particles to a third average size, smaller than the second average size, prior to tape casting the slurry to form the green tape.

8. The method of claim 5, wherein the hydrodynamic cavitation process further comprises:
subjecting the raw material to a hydraulic pressure of about 1,000 psi to about 65,000 psi.

9. The method of claim 5, wherein the slurry is produced at a rate of about 0.1 liters per minute to about 5 liters per minute.

10. The method of claim 5, wherein the raw material further comprises at least one of a deflocculant, a binder, and a plasticizer.

11. The method of claim 5, wherein the raw material has a first viscosity and the slurry has a second viscosity, lower than the first viscosity.

12. The method of claim 5, wherein the green tape has a thickness of about 100 microns, and the thickness of the green tape varies by less than about 3% at multiple points across a surface of the green tape.

13. The method of claim 5, wherein the green tape has a thickness of about 100 microns and a roughness parameter $R_a$ of less than or equal to about 0.4 microns.

14. The method of claim 5, wherein the green tape has a density of about 60% to about 80%.

15. The method of claim 5, wherein the method does not include ball milling the raw material.

16. The method of claim 5, wherein the method does not include de-airing the product material.

17. The method of claim 5, further comprising forming the green tape into a device suitable for use as at least a component of at least one of:
a. a transfer tape for artistic applications;
b. a pottery coating;
c. a photoactive glass film;
d. a refractory ceramic;
e. a catalyst support;
f. a fuel tank insert;
g. a loudspeaker cover;
h. a ceramic-impregnated fabric;
i. an infrared sensor;
j. a human-implantable electronic device;
k. a power amplifier module;
l. a radio frequency front end module;
m. a transmission control unit;
n. an energy harvester; and
o. a biosensor.

18. A method comprising:
introducing a volume of a raw material comprising at least one deflocculant, at least one plasticizer, at least one binder, and particles comprising at least one metal-containing or carbon containing material through a first orifice of a chamber;
applying a hydrodynamic cavitation process to the raw material in the chamber to produce a slurry, wherein the particles comprising at least one metal-containing material have a first average particle size in the raw material and a second average particle size in the slurry, the second average particle size smaller than the first average particle size;
causing the slurry to exit the cavitation chamber through a second orifice; and
tape casting the slurry to form a green tape.

19. The method of claim 18, further comprising controlling a temperature of the raw material to be within about 10 degrees Celsius to about 90 degrees Celsius before and after the hydrodynamic cavitation process.

20. The method of claim 18, wherein applying the hydrodynamic cavitation process further comprises subjecting the raw material to a hydraulic pressure of about 1,000 psi to about 65,000 psi.

21. The method of claim 18, wherein the method does not include ball milling the raw material.

22. The method of claim 18, wherein:
the green tape has a thickness of about 100 microns;
the thickness of the green tape varies by less than about 3% at multiple points across a surface of the green tape; and
the green tape has a roughness parameter $R_a$ of less than about 0.4 microns.

23. The method of claim 18, wherein the carbon-containing material comprises at least one of graphene, graphite, and carbon nanotubes.

* * * * *